US010465837B2

(12) United States Patent
Speggiorin et al.

(10) Patent No.: US 10,465,837 B2
(45) Date of Patent: Nov. 5, 2019

(54) BALANCED SUPPORT HEAD FOR VIDEO/PHOTOGRAPHIC EQUIPMENT

(71) Applicant: VITEC IMAGING SOLUTIONS S.p.A., Cassola (IT)

(72) Inventors: Paolo Speggiorin, Mussolente (IT); Davide Guidolin, Rosa' (IT)

(73) Assignee: VITEC IMAGING SOLUTIONS S.P.A, Cassola (IT)

( * ) Notice: Subject to any disclaimer, the term of this patent is extended or adjusted under 35 U.S.C. 154(b) by 0 days.

(21) Appl. No.: 16/093,185

(22) PCT Filed: Apr. 14, 2017

(86) PCT No.: PCT/IB2017/052166
§ 371 (c)(1),
(2) Date: Oct. 12, 2018

(87) PCT Pub. No.: WO2017/179020
PCT Pub. Date: Oct. 19, 2017

(65) Prior Publication Data
US 2019/0120420 A1    Apr. 25, 2019

(30) Foreign Application Priority Data

Apr. 15, 2016  (IT) .................. 102016000038984

(51) Int. Cl.
*F16M 11/10*    (2006.01)
*F16M 11/04*    (2006.01)
(Continued)

(52) U.S. Cl.
CPC ........... *F16M 11/10* (2013.01); *F16M 11/041* (2013.01); *F16M 13/00* (2013.01); *G03B 17/561* (2013.01); *F16M 2200/041* (2013.01)

(58) Field of Classification Search
None
See application file for complete search history.

(56) References Cited

U.S. PATENT DOCUMENTS

| 4,083,524 A | 4/1978 | O'Connor |
| 4,466,590 A * | 8/1984 | Parks ................ F16M 11/10 |
| | | 248/185.1 |

(Continued)

FOREIGN PATENT DOCUMENTS

| DE | 3008637 A1 | 9/1981 |
| EP | 0031595 A1 | 7/1981 |
| WO | 2013023277 A1 | 2/2013 |

*Primary Examiner* — William B Perkey
(74) *Attorney, Agent, or Firm* — Volpe and Koenig, P.C.

(57) ABSTRACT

A balanced support head (1) for video/photographic equipment (2a), comprising a base (3), a platform (2) to which the equipment can be detachably fixed and which can turn relative to the base about a horizontal axis of oscillation (X), as well as a balancing device (10) capable of offsetting the oscillation of the platform caused by the weight of the equipment and the platform. The balancing device comprises a spring (12) fastened to the base and extending towards the platform along a substantially vertical, axis (Z) of said base, and also an abutment element (16) fastened to the platform and abutting one end (15a) of the spring at a predetermined distance (R) from the axis of oscillation, so that, when the platform is oscillated relative to the base from a vertical, balanced position, the abutment element is displaced relative to the vertical axis along the end of the spring, such that the force exerted thereby on the abutment element generates a balancing torque with a sign opposite that generated by the weight of the equipment and of the platform.

10 Claims, 4 Drawing Sheets

(51) Int. Cl.
  *G03B 17/56* (2006.01)
  *F16M 13/00* (2006.01)

(56) References Cited

U.S. PATENT DOCUMENTS

| | | | |
|---|---|---|---|
| 4,732,357 A | 3/1988 | Lindsay | |
| 4,955,568 A | 9/1990 | O'Connor | |
| 5,389,972 A * | 2/1995 | Cartoni | F16M 11/10 |
| | | | 248/183.1 |
| 5,553,821 A * | 9/1996 | Ishikawa | F16M 11/10 |
| | | | 248/185.1 |
| 5,605,101 A * | 2/1997 | Lindsay | F16M 11/10 |
| | | | 108/2 |
| 2004/0051024 A1* | 3/2004 | Lawrence | F16F 15/28 |
| | | | 248/578 |
| 2004/0113033 A1* | 6/2004 | Johnson | F16M 11/041 |
| | | | 248/183.3 |
| 2005/0230576 A1* | 10/2005 | Leimbach | F16M 11/10 |
| | | | 248/177.1 |
| 2006/0066809 A1* | 3/2006 | Cartoni | F16M 11/041 |
| | | | 352/243 |
| 2010/0243851 A1 | 9/2010 | Murrow et al. | |
| 2013/0051783 A1* | 2/2013 | Piccoli | F16M 11/10 |
| | | | 396/428 |
| 2014/0029231 A1 | 1/2014 | Fu et al. | |
| 2018/0100615 A1* | 4/2018 | Becker | F16M 11/08 |
| 2018/0320813 A1* | 11/2018 | Karman | F16M 11/14 |
| 2019/0120420 A1* | 4/2019 | Speggiorin | F16M 11/041 |

* cited by examiner

BALANCED SUPPORT HEAD FOR VIDEO/PHOTOGRAPHIC EQUIPMENT

TECHNICAL SCOPE

The present invention relates to a balanced support head for video/photographic equipment of the type including the features mentioned in the preamble of the main claim.

TECHNOLOGICAL BACKGROUND

In the video/photography field, and particularly in cinematography, whether amateur or professional, it is known that the video/photographic equipment can be positioned and handled with the aid of suitable support heads.

In particular, there are known support heads comprising a base and a platform, to which the equipment is coupled, in which the platform is connected to the base so as to be able to oscillate about one or more axes of oscillation.

By moving the platform, and consequently the equipment fixed thereto, about a horizontal axis of oscillation that is perpendicular to the optical axis of the equipment, known as the "tilt" axis, it is possible, for example, to adjust the orientation of the equipment relative to the horizontal plane, allowing the lens to be turned upwards or downwards.

This oscillation movement, however, generally causes the centre of gravity of the system formed by the equipment and platform to be displaced so that, when this centre of gravity leaves the vertical plane containing the axis of oscillation, the system becomes unbalanced and the equipment tends to fall over.

This imbalance is more correctly described by identifying the moment of the force of gravity of the equipment/platform system relative to the axis of oscillation.

This moment is proportional to the intrinsic weight (P) of the platform and equipment assembly, to the distance (H) of the centre of gravity of said assembly from the axis of oscillation and to the sine of the angle ($\alpha$) of oscillation of the above-mentioned centre of gravity, according to the relationship:

$$C = P \cdot H \cdot \sin(\alpha)$$

The angle of oscillation ($\alpha$) is defined as the angle between the vertical plane comprising the axis of oscillation and the plane comprising the axis of oscillation and passing through the centre of gravity of the platform and equipment assembly. Therefore, when the centre of gravity of the platform/equipment assembly is placed perpendicularly to the axis of oscillation, the angle of oscillation is equal to 0° (balance position).

From the relationship given above, it can be deduced that, when the equipment is particularly heavy, for example video cameras, the oscillation movement about the axis of tilt can prove difficult and laborious for the operator to control, with the risk of the equipment dangerously falling.

To avoid these unwanted drawbacks, it is known to produce support heads comprising balancing devices capable of offsetting any uncontrolled oscillation of the platform from the vertical position of equilibrium.

Some of the known balancing devices comprise mechanisms that supply a counter torque that opposes the falling torque proportionally to the angle of oscillation.

Such mechanisms can, for example, consist of a torsion spring placed between the platform and the base.

However, the applicant has noted that, whereas the moment of imbalance (or falling torque) is substantially proportional to the sine of the angle of oscillation, the balancing torque produced by the torsion spring is substantially proportional to the value of the angle of oscillation.

This difference can be disregarded only for sufficiently small values of the angle of oscillation, making balancing devices designed in this way ineffective since, irrespective of other magnitudes, they cannot guarantee stable equilibrium for relatively wide oscillation ranges.

Another balancing mechanism, described in patent U.S. Pat. No. 4,732,357, provides for the use of a support head comprising a kinematic system comprising compression springs that make it possible to obtain a counter torque equal to the falling torque for any value of the angle of oscillation.

The main drawback of this solution is represented by the fact that a device produced according to U.S. Pat. No. 4,732,357 is effective only for equipment whose intrinsic weight falls within a predetermined, fairly small range, so that equipment of a different weight often has to be mounted on different heads.

Another example of balanced support heads is described in WO 2013/023277.

In this support head, a balancing device is provided that comprises an air spring, of the type having a cylinder and piston, extending between the base and platform of the support head, in which the cylinder is joined to the base, and the piston, at the end opposite the cylinder, is joined to the platform.

Also in this type of support head, however, the counter torque produced by the balancing device depends on the angle of oscillation in a different way to the falling torque. Furthermore, the balancing device is bulky and is outside the head, in an is unprotected position.

DE 3008637, EP 31595 and U.S. Pat. No. 4,083,524 show examples of support heads having balancing systems comprising a pair of vertical springs spaced apart from the horizontal axis of oscillation.

US2010/243851 shows an example of a support head having a balancing system comprising a spring that, when the platform is oscillated about the axis of oscillation (tilt axis) in one direction, is made to oscillate in the opposite direction about another, horizontal axis.

The above-mentioned solutions are, however, very bulky and rather structurally complex.

The problem addressed by the present invention is that of providing a balanced support head, which is structurally and functionally designed to at least partially overcome the drawbacks mentioned with reference to the cited prior art.

In particular, a first object of the invention is to produce a balanced support head comprising a balancing device capable of effectively offsetting the falling torque when the angle of oscillation is varied.

A second object of the invention is to produce a balanced support head comprising a balancing device capable of offsetting the falling torque for a wide range of values of weight of the video/photographic equipment supported.

Another object of the invention is to produce a balanced support head, in which the balancing device is placed in a protected position and does not cause a substantial increase in the dimensions of the support head, maintaining a compact configuration.

This problem is solved and these aims are achieved by the present invention by means of a balanced support head produced in accordance with the following claims.

The features and advantages of the invention will be more clearly apparent from the detailed description of a preferred embodiment thereof, illustrated by way of non-restrictive example, with reference to the attached drawings, in which.

Figure 1:
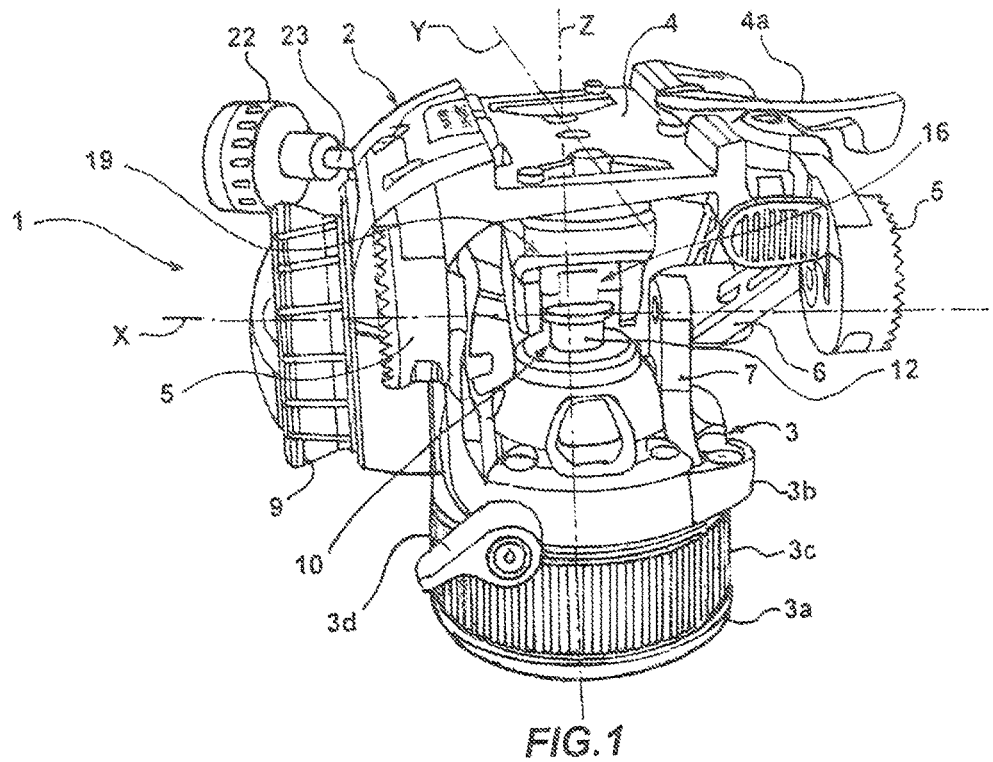
FIG. 1 is a schematic perspective rear view of a balanced support head produced according to the present invention.
Figure 2:
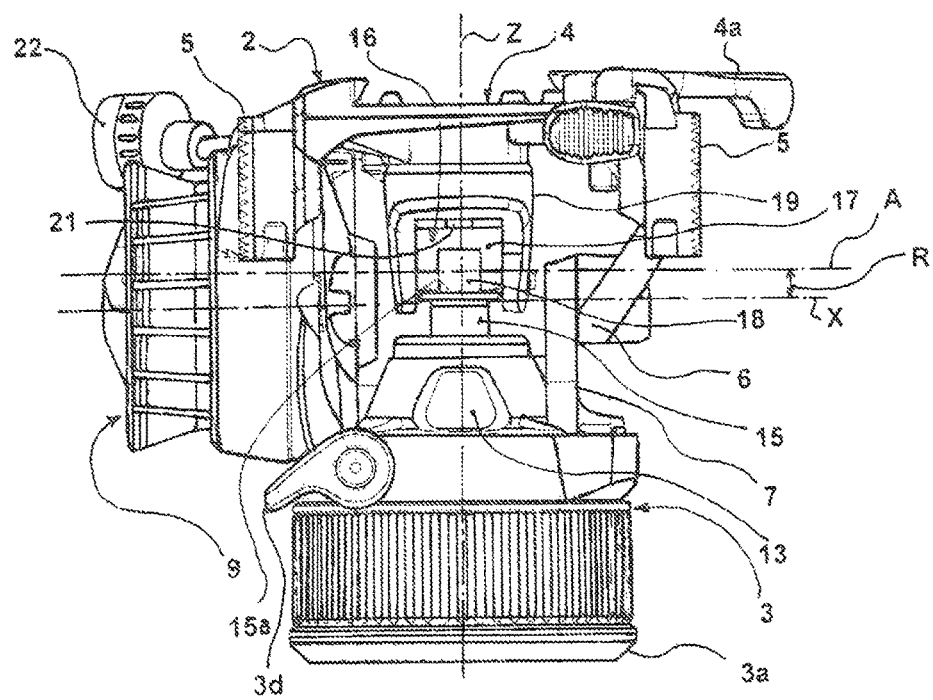
FIG. 2 is a schematic view in a rear elevation of the head in FIG. 1.
Figure 3:
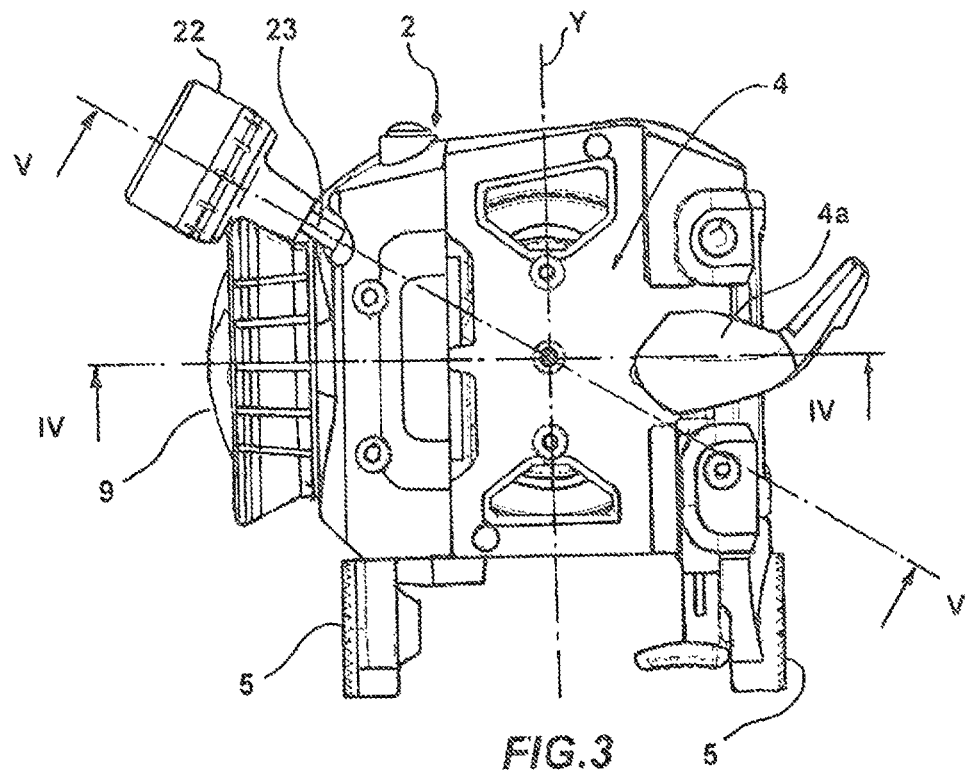
FIG. 3 is a schematic plan view of the head in FIG. 1.
Figure 4:
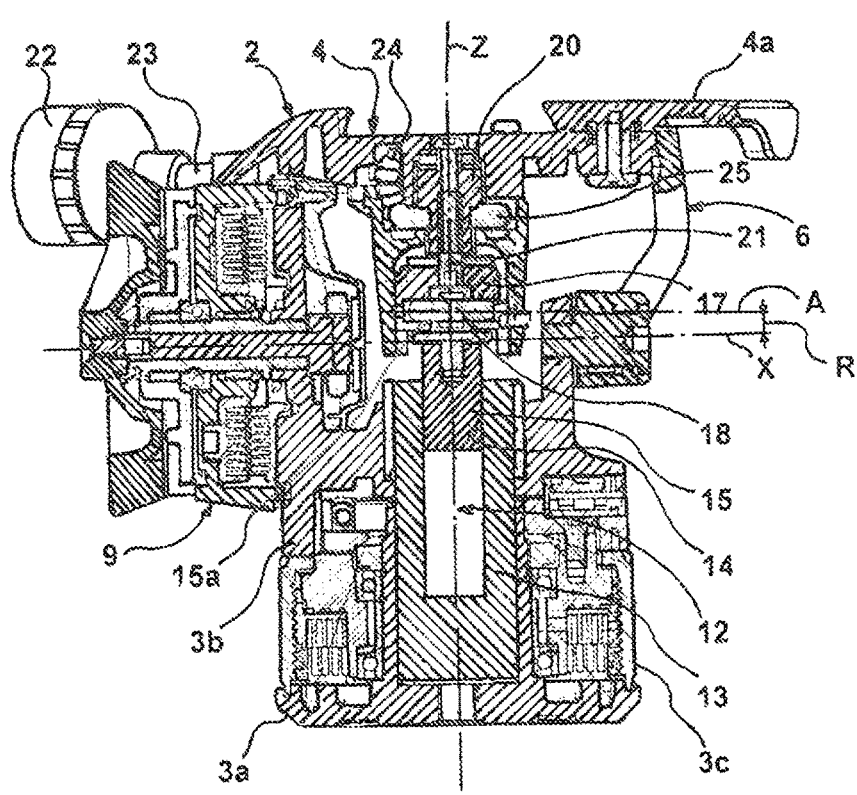
FIG. 4 and FIG. 5 are sectional views along the plane IV-IV and the plane V-V of FIG. 3, respectively.
Figure 5:
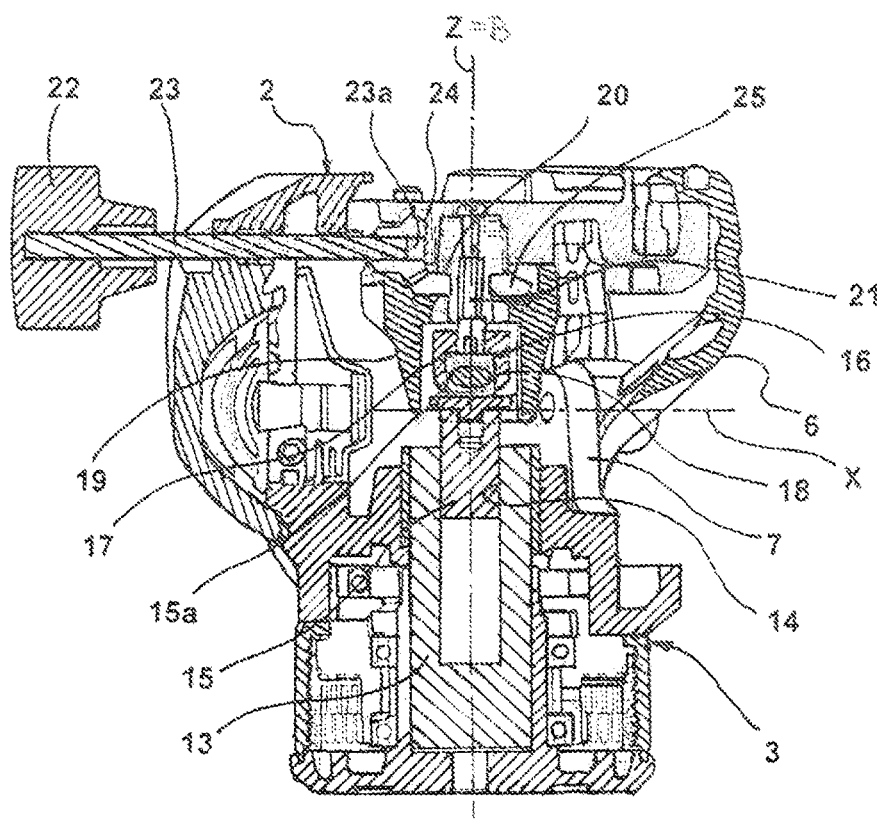

With reference to the figures listed above, reference numeral 1 denotes a balanced support head as a whole, which is produced according to the present invention.

The head 1 is preferably a head having two axes of rotation and comprising a platform 2 fixed to a base 3 with the ability to oscillate about a corresponding, substantially horizontal axis of oscillation X, capable of allowing "tilt" movement of a piece of video/photographic equipment 2a.

The base 3 comprises a lower body 3a and an upper body 3b, which is connected to the lower body 3a with the ability to rotate about a panoramic axis Z, which is substantially vertical and perpendicular to the axis of oscillation X.

A fluid cartridge 3c, known per se in the field, is also placed between the lower body 3a and the upper body 3b of the base 3, which cartridge is capable of ensuring that the relative rotary movement about the panoramic axis Z is smooth and uniform.

The base 3 is also provided to be fixed to a suitable support, such as a tripod, and for this purpose a threaded hole is made in the lower body 3a, for a standard screw attachment.

The relative rotation between the lower body 3a and the upper body 3b can be suitably locked by means of a locking pin 3d.

The video/photographic equipment 2a, for example a video camera, can be detachably fixed to the top of the platform 2, opposite the base 3.

In particular, a seating 4 is made on the top of the platform 2, preferably having a dovetail section that is provided to accommodate an attachment plate with the ability to slide in a longitudinal direction Y thereof, which attachment plate can in turn be fastened to the bottom of the video/photographic equipment 2a.

The longitudinal direction Y is at a distance from and oriented perpendicularly to the axis of oscillation X.

Preferably, the attachment plate is fastened to the video/photographic equipment 2a in such a way that the longitudinal direction Y, in which the attachment plate can slide inside the seating 4, is parallel to an optical axis T of the video/photographic equipment 2a and can be fastened in the preselected position by means of a locking lever 4a.

Also provided on the platform 2 is a pair of attachments 5, extending from the sides of the seating 4 and projecting longitudinally towards a rear side of the platform 2. The attachments 5 are preferably engaged with teeth at the front, capable of allowing one or more control levers ("pan bars") to be fastened to the platform 2, which levers can be used by the operator to move the video/photographic equipment 2a in rotation about the axis X and/or the axis Z and also, if appropriate, to control the main functions of the video/photographic equipment 2a, using remote controls.

The platform 2 comprises an arm 6 extending from one side of the seating 4 towards the base 3, which arm is rotatably fastened to a protuberance 7 extending from the upper body 3b of the base 3 towards the platform 2 by means of a pivot 8 defining the axis of oscillation X.

Opposite the arm 6 and the protuberance 7, a fluid cartridge 9 is also provided, which is coaxial with the axis of oscillation X and is fastened to the platform 2 and to the upper body 3b of the base 3, to ensure that the relative rotary movement about the axis of oscillation X is smooth and uniform.

The support head 1 further comprises a balancing device 10 capable of offsetting the oscillation of the platform 2 about the axis of oscillation X, which oscillation is generated by the weight of the video/photographic equipment 2a and the platform 2.

The balancing device 10 comprises a spring 12, integrally fastened to the base 3 and extending along a substantially vertical axis of the base 3 that intersects the axis of oscillation X.

The vertical axis along which the spring 12 extends, and consequently along which it exerts its action, is fixed and does not depend on the oscillation of the platform 2 relative to the base 3. Moreover, in the preferred example described here, this vertical axis coincides with the panoramic axis Z and will be identified as such below.

In the most preferred embodiment of the invention, the spring 12 is a pneumatic spring, although the use of a different type of spring can also be provided.

The spring 12 comprises a cylinder 13 extending along the vertical axis Z, in which, via a hole 14, a piston 15 is engaged.

The piston 15, preferably circular in section, extends along the vertical axis Z, coaxially with the cylinder 13, and protrudes from the cylinder 13 by a free end 15a thereof, extending towards the platform 2 between the protuberance 7 and the fluid cartridge 9.

The cylinder 13 is sealed and contains a pressurised gas such as nitrogen. For the purposes of the present invention, when the spring is in the rest state and at ambient temperature, the gas pressure inside the cylinder is preferably between 50 and 150 bar.

The free end 15a of the piston 15, which defines one end of the spring 12, has a flat surface that is substantially perpendicular to the vertical axis Z.

In an alternative embodiment, the free end 15a of the piston 15 can have a curved surface, for example a concave or convex surface.

The balancing device 10 further comprises an abutment element 16 fastened to the platform 2 and extending towards the base 3, which element abuts the end 15a of the piston 15 in order to apply compressive stress to the spring 12.

The abutment element 16 comprises a slide 17 to which a bearing 18 is fastened, intended to come into contact with the end 15a of the piston 15. The bearing 18 has an axis A that is substantially parallel to the axis of oscillation X, such that, when the abutment element 16 is displaced relative to the piston 15, the bearing 18 rolls around on its free end 15a.

The axis A of the bearing 18 of the abutment element 16 is spaced apart from the axis of oscillation X by a distance R. Advantageously, the abutment element 16 is fastened to the platform 2 with the ability to slide from and towards the base 3 so as to be able to adjust the distance R.

For this purpose, the slide 17 is fastened to the platform 2 with the ability to slide inside a forked body 19, in whose opposite prongs respective guide channels are made, extending towards the base 3 and engaged with corresponding attachment parts protruding from the slide 17.

The balancing device 10 further comprises a mechanism 20 for adjusting the distance R between the axis of oscillation X and the free end 15a where the spring 12 abuts the abutment element 16.

The adjustment mechanism 20 comprises a pivot 21 fastened at a first end thereof to the slide 17, the axis of which extends along an axis of adjustment coupling the platform 2 to the base 3.

The pivot 21 can also be displaced along said axis of adjustment so as to move the abutment element 16 closer to or away from the axis of oscillation X, by means of a is control lever 22 protruding from the platform 2 and comprising a shaft 23 that can rotate about its own axis.

The control lever 22 is connected to the pivot 21 by means of a bevel gear comprising a first bevel gear element 24 arranged coaxially at one end 23a of the shaft 23 and a second bevel gear element 25, which is engaged with the first bevel gear element 24 at an external ring gear thereof and is also screwed to the pivot 21 in an axial, threaded hole, through which the pivot 21 passes.

In this way, when the control lever 22 is turned about its own axis, the pivot 21 is displaced along the axis of adjustment, moving the slide 17 of the abutment element 16 away from or towards the base 3.

Advantageously, the control lever 22 extends from opposite the attachments 5, in a horizontal direction but tilted relative to the longitudinal direction Y of the seating 4. The operator can thereby easily manoeuvre the lever 22 without interfering with any control levers fastened to the attachments 5.

The functioning of the support head 1 is described below.

The head 1 is initially positioned with the base 3 arranged so that the axis of oscillation X is on a horizontal plane and the platform 2 is oriented vertically above the base 3, so that the seating 4 is substantially perpendicular to the panoramic axis Z (coinciding with the axis of the spring 12).

The video/photographic equipment 2a, for example a video camera, is thus coupled to an attachment plate that is connected to the platform 2 at the seating 4. The attachment plate is thus displaced in the longitudinal direction Y of the seating 4 until the centre of gravity G of the assembly formed by the platform 2 and the equipment 2a is positioned vertically above the axis of oscillation X. The attachment plate is then locked in position inside the seating 4 by the locking lever 4a.

Figure 6A:
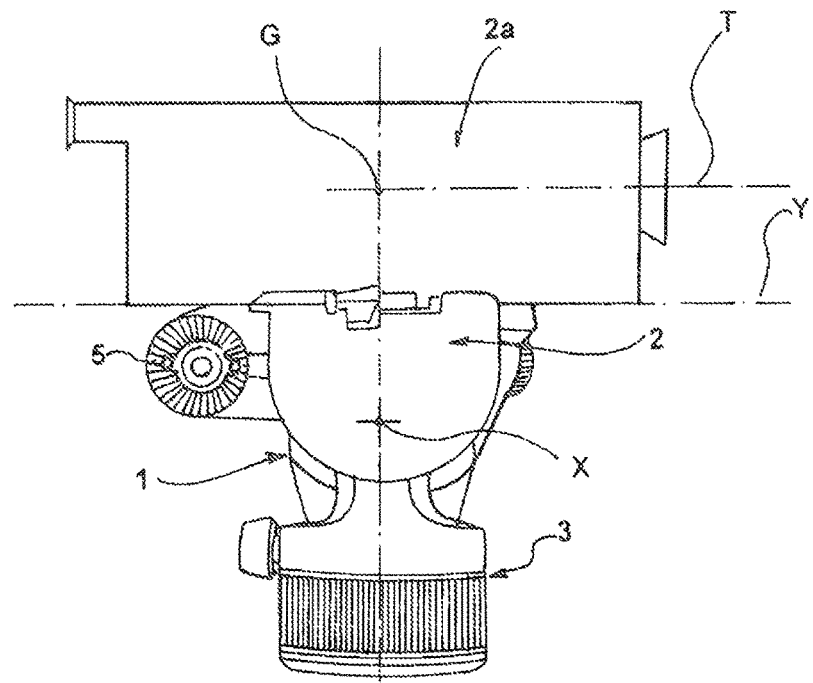
FIGS. 6a and 6b are schematic side views of the head in FIG. 1, in two different operating positions.

In this vertical equilibrium position, illustrated in FIG. 6a, the seating 4 is on a horizontal plane (as is, typically also the optical axis T of the video/photographic equipment 2a), and the centre of gravity G of the assembly formed by the is equipment 2a and the platform 2 is on a vertical plane containing the axis of oscillation X.

In this vertical equilibrium position, the angle of oscillation ($\alpha$), defined as the angle between the vertical plane comprising the axis of oscillation X and the plane A comprising the axis of oscillation X and passing through the centre of gravity G of the platform and equipment assembly, is zero.

In this position, the abutment element 16 abuts the end 15a of the spring 12 at a point vertically aligned with the axis of oscillation X, along the panoramic axis Z, and the axis of rotation A of the bearing 18 belongs to the vertical plane containing the axis of oscillation X, such that the force exerted by the spring 12 on the abutment element 16 has a zero moment with respect to the axis of oscillation X.

Moreover, in the equilibrium position, the pivot 21 connecting the abutment element 16 to the platform 2 and defining the direction of displacement of the abutment element 16 from and towards the base 3 is aligned with the vertical panoramic axis Z.

Figure 6B:
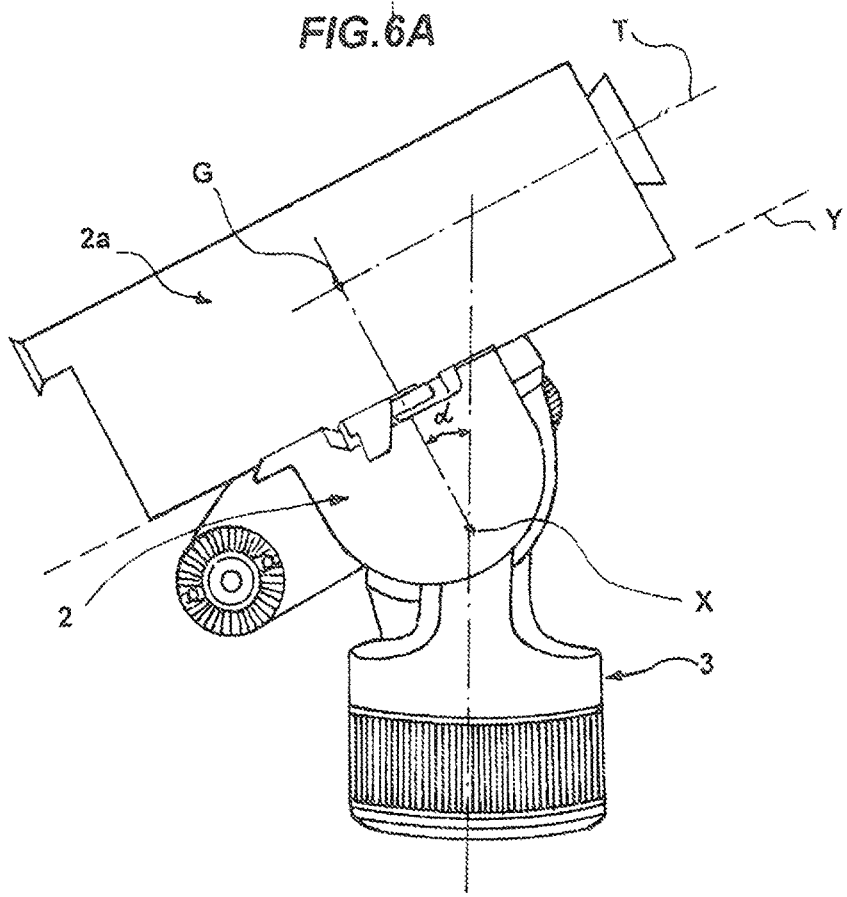

When the video/photographic equipment 2a, and with it the platform 2, is oscillated by an angle $\alpha$ about the axis of oscillation X (see FIG. 6b), the centre of gravity G, being displaced from the position of equilibrium described above, causes a falling torque Cd that tends to rotate the assembly consisting of the equipment 2a and the platform 2 downwards.

The falling torque Cd is represented by the following expression:

$$Cd = P \cdot H \cdot \sin(\alpha),$$

in which P is the weight of the equipment and platform assembly, H is the distance of the centre of gravity G from the axis X and $\alpha$ is the angle of oscillation defined above.

The oscillation of the platform 2 involves the simultaneous displacement of the bearing 18 over the flat surface of the free end 15a of the piston 15, which, however, remains in a fixed position relative to the base. Through the effect of this displacement, the force exerted on the abutment element 16 by the air spring 12 produces a balancing torque Cb on the platform 2 (in the direction counter to the falling torque Cd), which can be expressed as follows:

$$Cb = p \cdot A \cdot R \cdot \sin(\alpha),$$

in which p is the pressure of the gas inside the cylinder 13, A is the section of the piston 15 that is perpendicular to the axis Z in the area of the hole 14, and R is the distance between the axis of oscillation X and the axis of rotation A of the bearing 18.

Figure 7:
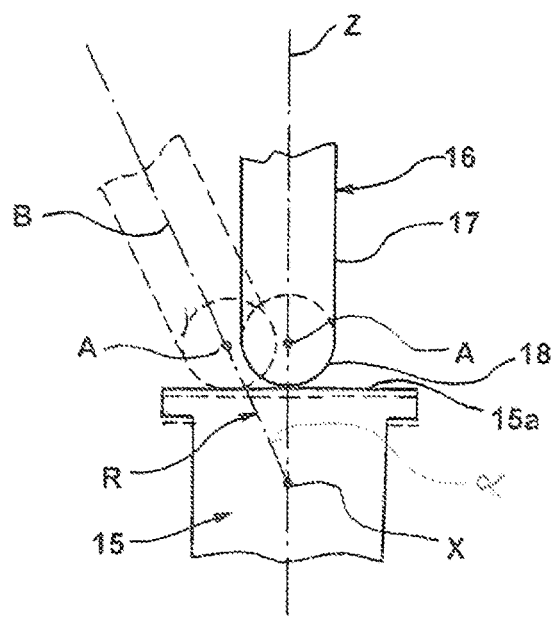
FIG. 7 is a view of a detail of the head in FIG. 1, in the operating positions illustrated in FIGS. 6a and 6b.

The displacement of the bearing 18 on the free end 15a—said free end having a flat surface—involves the piston 15 being lowered within the cylinder 13 (see FIG. 7, broken line). The air spring 12 is, however, sized such that the volume generated by the stroke of the piston 15 inside the cylinder 13, i.e. the reduction in the volume occupied by the gas in the cylinder 13 caused by the sliding movement of the piston 15, is less than or equal to 10% of the volume occupied by the gas when the angle $\alpha$ is zero. Consequently, it can be assumed to a good approximation that the pressure p does not vary substantially through the effect of the displacement of the bearing 18 and that it can therefore, for our purposes, be considered constant.

The torques Cd and Cb are equal when the following relationship exists:

$$R = (P \cdot H)/(p \cdot A)$$

which, as can be seen, is independent of the angle of oscillation $\alpha$.

As stated above, the distance R can be suitably adjusted by acting on the adjustment mechanism 20.

By rotating the control lever 22 about its axis, in fact, the first and second elements of the bevel gear are set in rotation and, on account of the threaded connection to the pivot 21, cause the abutment element 16 to be displaced along the axis of adjustment from and towards the base 3.

It will be noted that the adjustment mechanism described above allows the position of the abutment element 16 to be varied very simply and precisely.

Therefore, by appropriately displacing the abutment element 16 relative to the base 3, the balancing torque becomes equal to the falling torque for any value of the angle of oscillation $\alpha$, such that the assembly 100 is in equilibrium for any angular position produced by oscillation about the axis X.

Thanks to this feature, if the operator has to check that the falling torque induced by the oscillation of the equipment 2a about the axis of oscillation X is not adequately balanced by the balancing device 10, he or she can act on the control lever 22 to vary the distance R between the abutment element and axis of oscillation X, so as to achieve equality between the falling torque and the balancing torque, making the system definitively balanced for all other angles of oscillation, too.

In this way, it is possible to ensure that equipment 2a of different weights and dimensions is balanced on the support head 1, simply by varying the distance R appropriately. In particular, it is possible to ensure the balancing of equipment 2a weighing between 0 and a maximum admissible weight that depends on the features of the spring 12 and on the maximum value that can be assumed by the distance R.

In a preferred example, the support head 1 is able to balance equipment 2a having a maximum admissible weight of 8 kg with a centre of gravity 55 mm vertically above the attachment plate.

Moreover, it is noted that, by adjusting the value R, it is possible to effectively compensate for any variations in the pressure of the spring 12 arising from perceptible temperature variations.

In a preferred example, the distance R between the axes A and X can be adjusted between a minimum value of 0 mm (where there is no balancing action) and a is maximum value of about 10 mm.

Where the free end 15a of the piston 15 has a curved surface, particularly a concave or convex surface, the balancing torque produced by the balancing device 10 varies in different ways with the angle of oscillation, causing overbalancing (concave surface) or underbalancing (convex surface) for certain ranges of angles. Moreover, in this case, at equal oscillation, the piston 15 is lowered to a greater or lesser extent and, consequently, the value of the pressure inside the cylinder 13 varies to a greater or lesser extent.

It is also provided that the free end 15a of the piston 15 has a mixed type of surface, having a flat portion and a curved segment.

By ensuring that stable positioning can be achieved for the equipment supported by the platform, which positioning can also be independent of the angle of oscillation if desired, the invention solves the problem set out with reference to the cited prior art, simultaneously achieving multiple advantages.

These include the fact of being able to produce a compact balancing device, capable of providing high forces in a small space and having a limited number of components.

Thanks to these features, the balancing device is contained within the overall dimensions of the head, in a protected position and with no potentially dangerous protruding parts.

Moreover, the support head can be correctly adapted, simply and precisely, to a huge range of video/photographic equipment.

The invention claimed is:

1. A balanced support head (1), for video/photographic equipment (2a), comprising:
   a base (3),
   a platform (2) to which said equipment can be detachably fixed, said platform being fixed to said base so as to oscillate about a substantially horizontal axis of oscillation (X), and
   a balancing device (10) capable of offsetting the oscillation of said platform about said axis of oscillation caused by the weight of said equipment and of said platform,
   wherein said balancing device comprises:
   a spring (12) fastened to said base and extending towards said platform along a substantially vertical axis (Z) of said base, said substantially vertical axis intersects said axis of oscillation (X), and
   an abutment element (16) fastened to said platform and abutting one end (15a) of said spring facing towards said platform,
   said abutment element abutting said spring at a predetermined distance (R) from said axis of oscillation, so that when said platform is oscillated relative to said base from a vertical balanced position about said axis of oscillation, said abutment element is displaced away from said substantially vertical axis along said end of said spring, which remains fixed relative to said base, such that a force exerted on said abutment element by said spring generates a balancing torque with a sign opposite to the torque generated by the weight of said equipment and of said platform.

2. The balanced support head according to claim 1, wherein said end (15a) of said spring has a flat surface, which is substantially perpendicular to said vertical axis, on which said abutment element (16) abuts.

3. The balanced support head according to claim 1, wherein said end (15a) of said spring has a convex or concave surface on which said abutment element (16) abuts.

4. The balanced support head according to claim 1, wherein said spring is an air spring having a cylinder (13) and piston (15), said cylinder being fastened to said base, said piston extending from said cylinder towards said platform along said vertical axis and having a free end on which said abutment element abuts.

5. The balanced support head according to claim 1, wherein said abutment element (16) can be rotated about an axis of rotation (A) so as to roll around on said end of said spring when said platform is oscillated about said axis of oscillation.

6. The balanced support head according to claim 5, wherein said axis of rotation (A) is substantially parallel to said axis of oscillation (X).

7. The balanced support head according to claim 1, wherein said abutment element is fastened to said platform with the ability to slide from and towards said base so as to adjust said distance between said abutment element and said axis of oscillation.

8. The balanced support head according to claim 1, wherein said balancing device comprises a mechanism (20) for adjusting a distance between said axis of oscillation and said abutment element.

9. The balanced support head according to claim 8, wherein said adjustment mechanism comprises:
   a pivot (21) fastened at one of its ends to said abutment element and displaceable along an axis of adjustment (B) connecting said platform to said base,
   a control lever (22) protruding from said platform and comprising a shaft (23) rotatable about its own axis,
   and wherein said control lever is connected to said pivot so as to displace said pivot along said axis of adjustment following rotation of said shaft.

10. The balanced support head according to claim 9, wherein said control lever (22) is connected to said pivot by means of a bevel gear comprising a first bevel gear element (24) arranged coaxially at one end (23a) of said shaft (23), and a second bevel gear element (25) axially screw-fitted onto said pivot (21) and engaged with said first bevel gear element.

* * * * *